Aug. 16, 1938.          R. B. LEWIS ET AL          2,126,998
           APPARATUS FOR FILLING AND CLOSING BOTTLES
                 Filed Sept. 11, 1935        5 Sheets-Sheet 1

INVENTORS
Raymond B. Lewis,
BY John Reuther,
Beau, Brooks, Buckley & Beau.
ATTORNEYS Aug. 16, 1938.　　　R. B. LEWIS ET AL　　　2,126,998
APPARATUS FOR FILLING AND CLOSING BOTTLES
Filed Sept. 11, 1935　　　5 Sheets-Sheet 2

INVENTORS
Raymond B. Lewis,
BY John Reuther,
Bean, Brooks, Buckley & Bean.
ATTORNEYS Aug. 16, 1938.  R. B. LEWIS ET AL  2,126,998
APPARATUS FOR FILLING AND CLOSING BOTTLES
Filed Sept. 11, 1935    5 Sheets-Sheet 3

INVENTORS
Raymond B. Lewis,
BY John Reuther,
Beau, Brooks, Buckley & Beau.
ATTORNEYS

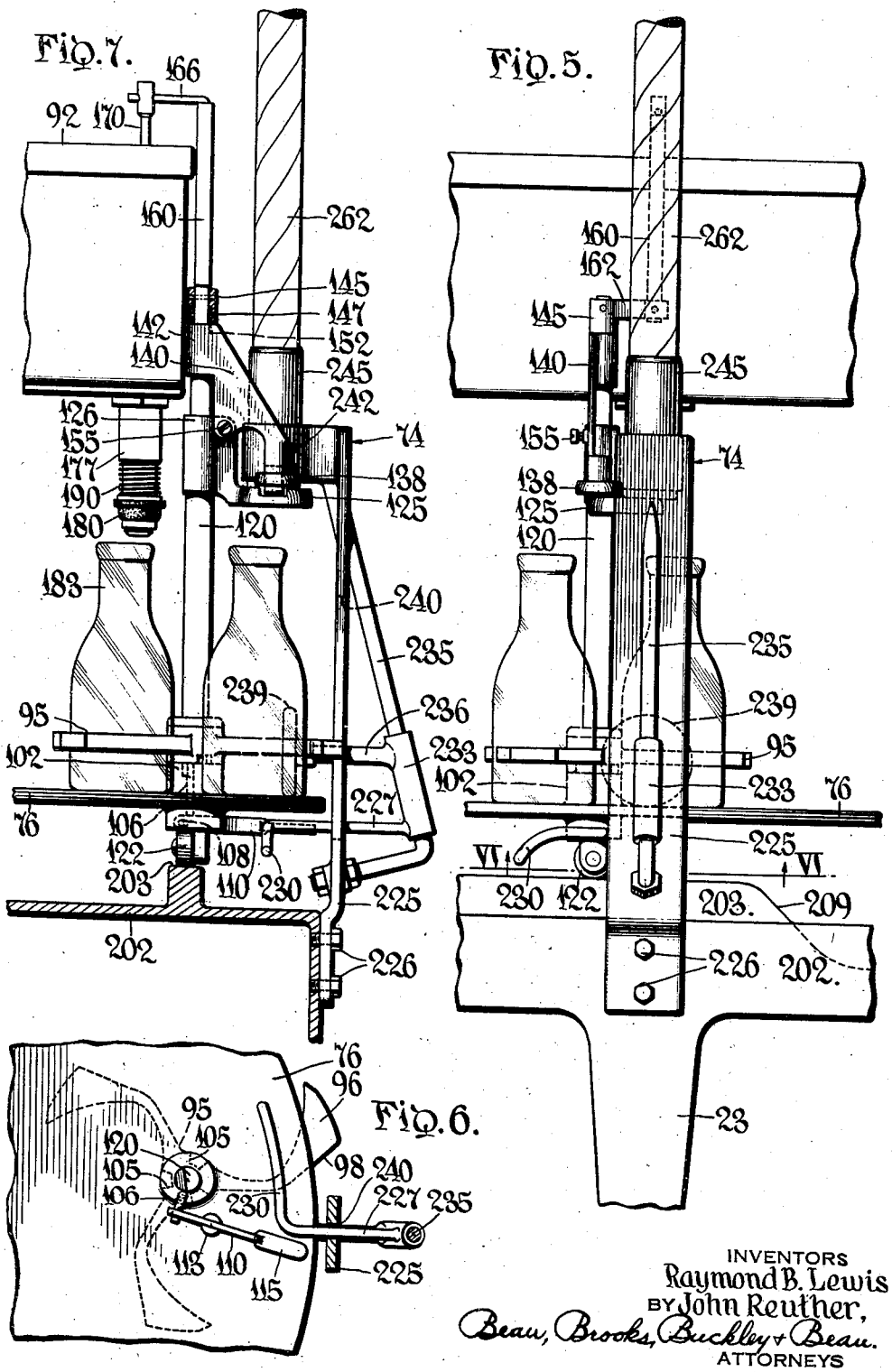

Aug. 16, 1938.   R. B. LEWIS ET AL   2,126,998
APPARATUS FOR FILLING AND CLOSING BOTTLES
Filed Sept. 11, 1935   5 Sheets-Sheet 5
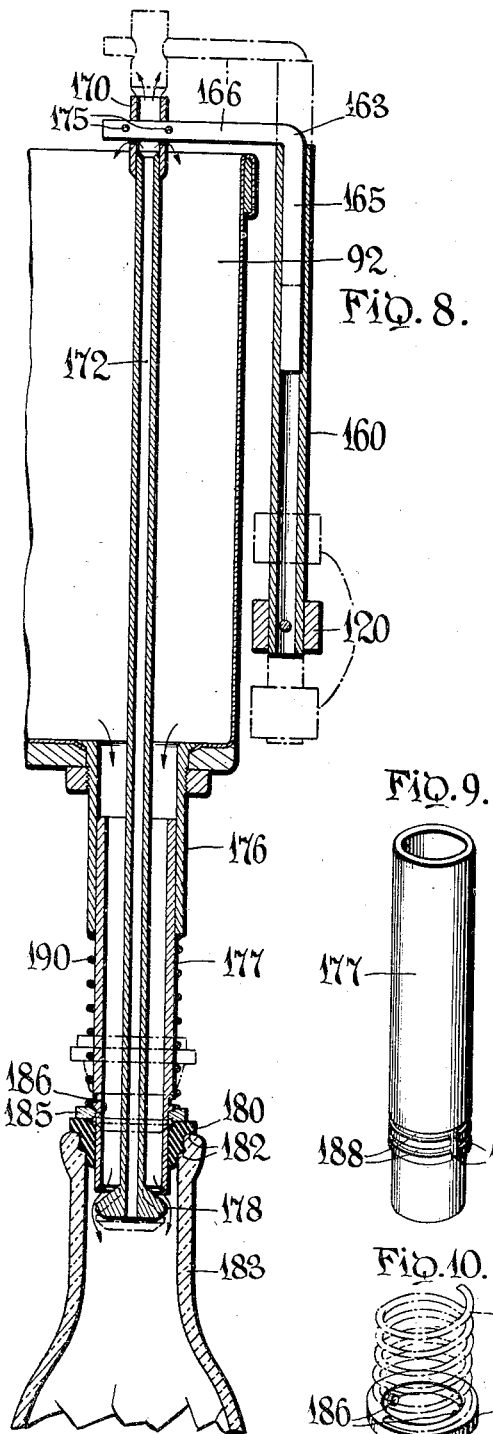
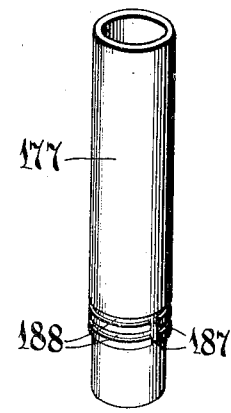
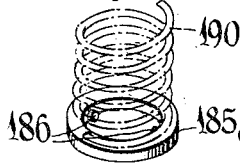
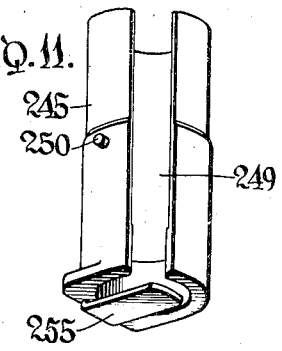
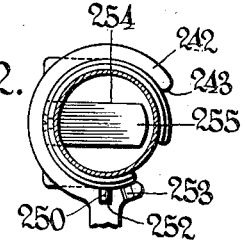
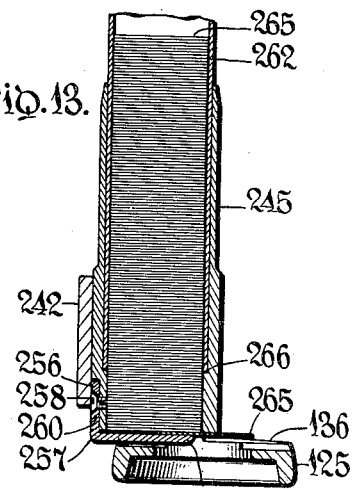
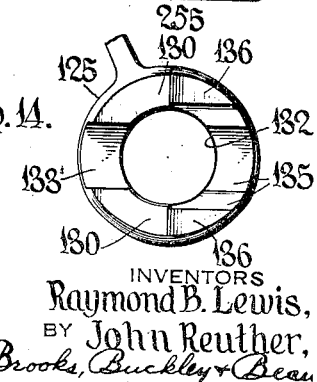
INVENTORS
Raymond B. Lewis,
BY John Reuther,
Beau, Brooks, Buckley & Beau
ATTORNEYS Patented Aug. 16, 1938

2,126,998

UNITED STATES PATENT OFFICE 2,126,998

APPARATUS FOR FILLING AND CLOSING BOTTLES

Raymond B. Lewis and John Reuther, East Aurora, N. Y.

Application September 11, 1935, Serial No. 40,162

5 Claims. (Cl. 226—76)

This invention relates to apparatus for filling and capping containers for liquids and it has particular relation to automatically operable machines designed to fill and cap milk bottles, and the like.

One object of the invention is to provide a bottle filling and capping machine applicable for either large or small scale operations, and which embodies improved and automatically operable features inexpensive in their manufacture.

Another object of the invention is to provide an improved machine which is adapted to automatically feed empty bottles to a filling mechanism and thence to the capping mechanism and then return them to a position from which they may be conveniently removed from the machine by the operator.

In the drawings:

Fig. 5 is a fragmentary elevation of a bottle filling and closing unit of the apparatus;

Fig. 6 is a fragmentary bottom plan of the structure shown in Fig. 5, with portions in section taken substantially along the line VI—VI of Fig. 5;

Fig. 7 is a fragmentary side elevation of the unit shown in Fig. 5 and with portions shown in section;

Fig. 8 is a fragmentary vertical section, on a larger scale, of a bottle filling device;

Fig. 9 is a perspective of a cylindrical conduit for filling a bottle;

Fig. 10 is a perspective of a spring and adjustable washer used in connection with the conduit;

Fig. 11 is a perspective of a magazine for receiving bottle caps;

Fig. 12 is a bottom plan of one of the bottle capping units;

Fig. 13 is a fragmentary vertical section of one of the bottle capping units; and Fig. 14 is a plan of the device shown in Fig. 13.

Figure 3:
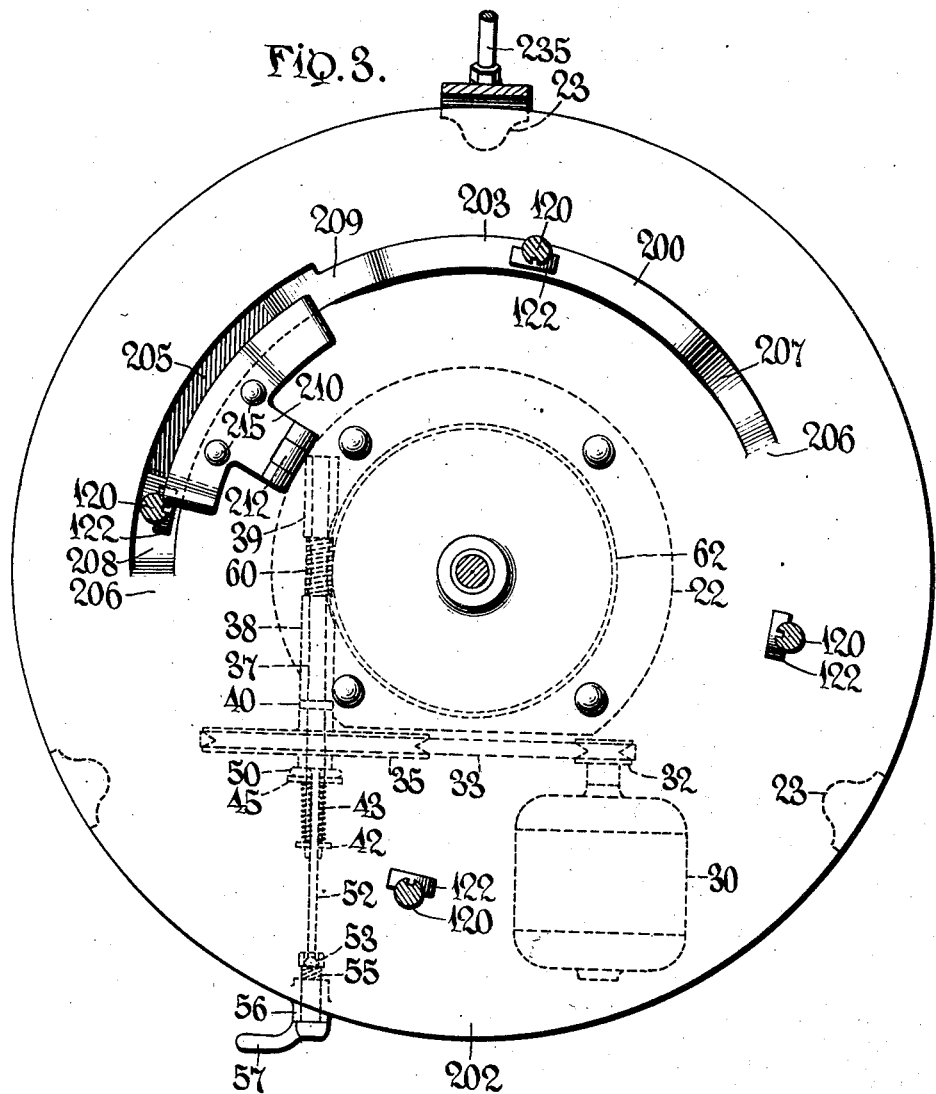
Fig. 3 is a horizontal section of the apparatus taken substantially along the line III—III of Fig. 1, portions being shown in plan.
Figure 4:
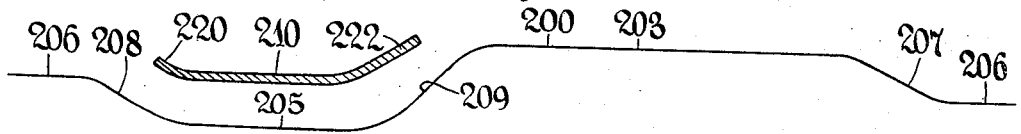
Fig. 4 is a diagrammatic illustration of the development of a cam track employed in the apparatus.

Referring to Fig. 3, a portable frame structure 20 is provided with a platform 22 that has legs 23 supporting it upon a suitable floor 25, or the like. Casters 26 in the ends of the legs facilitate movement of the apparatus as desired. A conventional motor 30, such as an electric motor, is rigidly mounted upon the platform 22 and it has a driving pulley 32 about which a driving belt 33 is trained. This belt is also trained about a driven pulley 35 larger than the driving pulley 32 and a suitable shaft 37 rotatable in bearings 38 and 39 carried upon the platform 22 rotatably supports the driven pulley 35. A friction shoulder 40 formed on the shaft 37 between the bearing 38 and the inner side of the driven pulley 35 gauges the pulley with respect to its alinement with the driving pulley 32.

The outer end of the shaft 37 extends beyond the outer side of the driven pulley 35 and is provided with a bracket 42 rigidly secured thereto in spaced relation to the outer side of the pulley. One end of a coil spring 43 that is normally under compression is supported against the bracket 42 and the other end of this spring rests against a washer 45 that is loosely and slidably mounted on the shaft adjacent the pulley. A plate 50 constituting one end of a yoke 52 is disposed loosely about the shaft 37 between the washer 45 and the side of the pulley and the spring normally urges the plate firmly against the side of the pulley to provide, in cooperation with the shoulder 40, a frictional drive between the pulley and the shaft.

The outer end of the yoke 52 is provided with a universal joint 53 connecting it to a screw-threaded bolt 55 that is screwthreaded into a boss 56 formed upon the outer side of the platform. A handle 57 adjacent the outer periphery of the platform is rigidly secured to the bolt and upon turning the handle to unscrew the bolt the yoke plate 50 is withdrawn from driving engagement with the side of the pulley. Then the pulley 35 can rotate idly upon the shaft.

The end portion of the shaft 37 adjacent the bearing 39 is formed with a worm 60 engaging a worm gear 62 that is non-rotatably carried upon a vertical shaft 63 by means of a spline connection 65. A socket 66 provided in the central portion of the platform 22 contains a thrust bearing 67 resting upon a set screw 68, that can be manipulated in order to adjust the vertical shaft 63 axially. The spline connection 65 permits axial adjustment of the shaft relative to the worm gear 62, but maintains a driving connection therewith.

A superstructure 70 is carried upon the vertical shaft 63 rotates therewith and includes a series of bottle filling and capping units 72, 73, 74 and 75, all of which are constructed and operate in the same manner, and hence, their details are designated by like reference characters.

The lower portion of the superstructure is in the form of a substantially horizontal revolving table 76 that is rigidly secured, as indicated at 79, to a base or integral flange 80 of a vertically disposed tubular support 82 which is screwthreaded along its outer surface, and in which the vertical shaft 63 is disposed. A sleeve 83 internally screwthreaded upon the outer tubular support 82 has its upper end rotatably supported upon a shoulder 85 adjacent the upper end of the shaft 63 and is provided with rigid handles 87 for manually rotating the sleeve 83 with respect to the tubular support 82. The upper end of the shaft 63 is provided with a collar 90 rigidly mounted thereon and which is rigidly secured to the bottom of a reservoir 92 designed to hold fluid, such as milk. By operation of the handles 87 the sleeve 83 can be rotated and thus operate to space the reservoir 92 and table 76 at various distances. During this adjustment the tubular support 82 moves slidably and axially of the vertical shaft 63.

Each filling and capping unit includes a bottle shifter 95 having substantially radial arms 96 that are formed with bottle receiving concave sections 97 and outer cam surfaces 98. A central bearing 99 of the shifter is rotatably mounted upon a sleeve 100 that is carried in a boss 102 formed in the body of the table 76 adjacent the edge thereof. A cap 103 screwthreaded upon the upper end of the sleeve 100 prevents displacement of the shifter 95 therefrom.

The sleeve 83 is marked with appropriate legends which can be coordinated with a gauge stem 93 mounted vertically upon the table 76. For example, the sleeve can have marks to indicate pint, quart, or other sizes of bottles and the apparatus adjusted to accommodate desired indicated size of bottle.

The lower surface of the bearing portion of the shifter is provided with a series of notches 105, (Fig. 6) and a pin 106 slidably mounted in the bearing boss 102 is adapted to engage at its upper end in one of the notches 105 while its lower end is connected in a slot 108 formed in the outer end of a lever 110. An intermediate portion of the lever 110 is pivoted, as indicated at 112, upon a support 113 on the table 76 and the outer lever end portion 115 is weighted to such extent that the end connected to the pin 106 always tends to engage the upper end of the latter in one of the notches 105. That is, upon rotation of the shifter 95 from the position shown in Fig. 6 the pin will automatically engage in one of the notches when the latter registers with the pin end.

A vertical camming bar 120 having a roller 122 mounted upon its lower end is slidably disposed in each of the sleeves 100 of the table bosses 102, and is splined, as indicated at 123, for the purpose of preventing its rotation in its sliding movement in the sleeve 100. A bottle capping head 125 is formed upon a bearing bracket 126 that has a spline connection 127 upon the camming column 120 and also rests upon a shoulder 128 formed upon an intermediate portion of the bar for engagement with the lower portion of the bracket. The upper surface of the head 125 (Fig. 14) is provided with spaced shoulders 130 a central opening 132, a rear groove or recess 133 communicating with the central opening 132, forward relatively larger recesses 135, and cut away portions 136 adjacent the shoulders 130.

A capping plunger 138 formed upon the lower end of a swinging arm 140 is normally disposed immediately above the opening 132 in the head 125 and the upper portion of the arm 140 is formed with a bearing sleeve 142 rotatably connecting the arm to the camming bar 120. The bearing or sleeve portion 142 of the arm 140 rests at its lower extremity upon a shoulder 143 formed on the bar and a collar 145 rigidly secured, as indicated at 146, to the bar immediately above the bearing sleeve 142 is provided with a torsion spring 147 surrounding the bar 120 and disposed in a recess 148 formed in the lower end of the collar 145. One end 150 of the torsion spring is secured to the collar 145 and the other end 152 is secured to the upper end of the arm 140. This spring 147 constantly urges the arm 140 in a counter-clockwise direction, as viewed in Fig. 2, about the bar 120 and the arm is limited adjustably in its swinging movement by means of a set screw 155 threaded through an intermediate portion thereof. The inner end of the set screw impinges against a flange 156 of the capping head bearing 126. Thus the position of the plunger 138 can be determined for proper axial alinement with the head opening 132.

As best shown in Figs. 5 and 8, the upper end portion of the camming bar 120 is provided with a tubular rod section 160 offset from the lower portion by means of a horizontal section 162 that rigidly connects the upper and lower portions of the bar. An angular rod 163 has its vertical portion 165 anchored in the upper end of the tubular section 160 and its upper horizontal section 166 extends inwardly and through the upper end of a tubular valve stem 170. An opening 172 through the valve member extends throughout from one end thereof to the other in order that fluid may pass therethrough.

The connection of the section 166 to the upper end of the valve stem 170 by means of suitable fasteners 175 does not provide a rigid assembly between these members, but at least slight pivotal action is possible.

The lower end of the valve stem 170 extends through a bottle filling conduit 176 that is secured in fluid tight relation to the reservoir 92 through the bottom of which it communicates. A sleeve 177 vertically slidable in the conduit 176 is normally engaged at its lower end by a valve head 178 that is rigid with the lower end of the valve stem 170, and normally closes the sleeve against leakage of fluid from the reservoir. It will be observed that the inner diameter of the nozzle or sleeve 177 is considerably larger than the outer diameter of the valve stem 170 and thus ample space for passage of fluid about the valve stem is provided.

The lower end of the sleeve 177 is surrounded in fluid tight relation by a yieldable or resilient collar 180 having lower shoulders 182 corresponding to configuration of the mouth of a bottle 183. The yieldable collar 180 fits tightly over the end portion of the sleeve 177 and is prevented from moving upwardly thereon by means of an adjusting ring 185 having inwardly projecting lugs 186 that are adapted to be inserted through gaps 187 communicating between circular recesses 188 in the lower end portion of the sleeve 177. After the lugs have been forced to a position adjacent one of the recesses 188 in which it is desired to anchor the ring 185, the latter is then turned in such position that it will be spaced from the gaps 187, and hence, held against axial displacement.

A coil spring 190 surrounds the sleeve 177 and has one end impinging upon the lower end of the conduit 176 while its other or lower end impinges upon the ring 185. Thus the sleeve 177 is always urged toward an extended position, although it can be forced inwardly in telescoping relation into the conduit against the resiliency of the spring.

The lower portion of the camming bar 120 with its roller 122 travels in a circular path about a cam track 200 provided upon the upper surface of a platform 202 that is rigid with the supporting legs 23 and for convenience is termed a stationary platform. This cam track includes a higher horizontal section 203, a lower horizontal section 205 and an intermediate horizontal section 206, the latter of which corresponds to the mean upper level of the platform 202. The intermediate section 206 merges into extremities of the sections 203 and 205 along inclined sections 207 and 208, respectively, and the sections 203 and 205 merge into each other along an inclined section 209.

A plate 210 having a hinge connection 212 to the surface of the platform 202 overlies the lower section 205 of the cam track, and bolts 215 extending through the platform 202 adjacent the latter section has coil springs 216 confined thereon between lower bolt heads 217 and the lower surface of the platform 202. Opposite end extensions 220 and 222 are inclined oppositely to correspond to the adjacent substantially parallel sections 208 and 209 respectively. Thus the plate will yield to predetermined upward force applied thereto tending to pivot it about the hinge connection against the resiliency of the springs.

A frame bracket 225 is bolted, as indicated at 226, in rigid relation to the stationary platform 202 and is provided with an inwardly extending arm 227 having a cam finger 230 thereon that is disposed in the path of movement of the weighted lever end 115 in such manner that in each revolution of the table 76 the pin 106 is withdrawn from the notch 105 of the bottle shifter 95. The interval during which the pin remains so withdrawn depends upon the length of the cam finger 230, as indicated in Fig. 6. The arm 227 is rigidly connected to a slide or sleeve 233 that is slidably but non-rotatably mounted upon an inclined guide bar 235 of the bracket 225.

A bearing arm 236 also extending rigidly from the slidable sleeve 233 is disposed parallel to the arm 227 and rotatably supports a disc wheel 239 resting upon the outer marginal portion of the table 76. The wheel rests under the weight of the sleeve and its connections upon the table 76, and is disposed in the path of one of the cam sections 98 of the bottle shifter 95 for the purpose of turning the shifter through a predetermined angle about the bearing sleeve 100 during the rotation of the table. The sleeve 233 is non-rotatable upon the guide bar 235 by virtue of the fact that the arms 227 and 236 extend through a slot 240 in the bracket 225 and they are movable upwardly and downwardly therein.

The upper portion of the bracket 225 is formed into an integral collar 242 having a gap 243 therein and into which is fitted a magazine holder 245 of substantially cylindrical form and having a slotted recess 249 extending longitudinally thereof.

A lug 250 formed upon one side of the holder 245 normally rests in a recess 252 in one of the embracing sides of the collar 242, and a second recess 253 of less depth than the recess 252 is also provided in the embracing wall of the collar and is designed for the purpose of supporting the holder 245 at a slightly higher elevation than the recess 252. It is to be understood that the holder 245 is slidable in and can be rotated in the collar to position it properly.

A bracket 254 having a plate 255 portion extending underneath and slightly spaced from the lower body portion of the holder 245, is provided with an upwardly disposed flange 256 mounted in a recess 259 in the body of the holder in order to render the outer surfaces of the flange and holder substantially continuous and flush. A screw 258 threaded into the body of the holder is disposed through a slot 260 disposed longitudinally of the holder in the flange and provides for slight adjustment of the tongue longitudinally of the holder or vertically thereof.

A tubular magazine 262 filled with bottle caps 265 is insertable into the holder 245 and can be guided to the bottom thereof by cooperation of slot-like recess 249 with the operator's fingers, the latter of which can thus function to place the magazine carefully in the position shown in Fig. 13 without danger of any of the caps becoming disalined or tilted. The lower portion of the magazine 262 rests upon a shoulder 266 formed about the inner circumferential portion of the holder barrel.

As the superstructure 70, including the table 76, rotates in response to operation of the motor 30, the shifter 95 approaches the wheel 239 which strikes the cam section 98 of one of the shifter arms 96 at substantially the same instant or slightly after the cam finger 230 has withdrawn the pin 106 from the recess 105. Thus the elements 95, 98 and 233, 236, 239 constitute a set of camming members in which the bottle shifting mechanism is included, and which, in response to rotation of the shaft 63 and table 76 as a unit, shift the bottles intermittently to insure proper registering of the latter with the sleeves or nozzles 177. During this operation the collar 242 of the stationary bracket 225 is in the path of movement of the capping plunger 138, and the latter (Fig. 2) is thus forced to one side about the bar 120 as a bearing and in opposition to the torsional action of the spring 147. The relative positions of the magazine holder 245 and the capping head 125 are shown in Fig. 13, and it will be observed that the head 125 passes immediately below the lower end of the holder in such manner that the plate 255 passes through the recesses 133 and 135 and between the shoulders 130. Each cap is larger than the recess 133, and hence, these shoulders pass upon opposite sides of the plate portion 255 of the bracket carrying with them one of the caps 265 which is thus disposed in registering relation with the central opening 132 of the capping head 125. When the holder 245 is supported by the lug 250 in the upper recess 253, the shoulders will not then be disposed in the path of the lower cap 265 that rests upon the plate 255, hence, the cap feeding mechanism is then latent, regardless of rotation of the table 76.

As soon as the capping head 125 has passed the cap feeding holder 245, the capping plunger 138 resumes its normal position in registering relation immediately above the opening 132 of the capping head. As the unit travels further, for example, in a counterclockwise direction, as viewed in Fig. 2, the cam roller 122 rides down the incline 209 underneath the plate 210 and the bar 120, together with the capping plunger 138, is drawn downwardly to apply the cap firmly in the mouth of the bottle.

During the operations just described, a bottle 183 adjacent one whose movements have been described with reference to the capping operation, and disposed in an adjacent concave portion 97 of one of the shifter arms 96, is moved by the shifter actuating wheel 239 to the position registering with the filling sleeve 177. The bottle can be placed upon the apparatus in the shifter while the cam roller 122 is located upon the high section 203 of the cam track. While the camming bar 120 is thus disposed in an upwardly extended position, as indicated in the upper broken lines of Fig. 8, the valve head 178 will have engaged the lower end of the cylinder 177, closed it, and telescoped it upwardly against the resistance of the spring 177 in such position as to hold the rubber collar out of engagement with the mouth of the bottle, and at an elevation above the tops of the bottles. Then upon movement of the unit by virtue of the cam roller 122 passing down the inclined cam section 209 into position underneath the cam plate 210, the end of the cylinder 177 then registering with one of the bottles moves into sealing relation, and after predetermined downward movement of the camming column, the valve member 178 opens the cylinder and permits fluid to enter the bottle. Air in the bottle escapes through the opening 172 in the valve stem. The complete filling of the bottle is assured by the fluid which seeks its level in the hollow valve stem and the capacity of such valve stem is such that it compensates for the displacement caused by the end of the cylinder 177 and valve head 178 during the filling operation. This fluid flows into the bottle as soon as the cam bar 120 again rides up on the cam section 207, and is then shifted as previously specified into position to be capped according to the previous description.

From this description, it will be apparent that the elements 120, 122 and 200 constitute a set of camming members operatively associated with the bottle filling sleeves or nozzles 177, and which, in response to rotation of the shaft 63 and table 76 as a unit, are operative intermittently to actuate the nozzles 177 into and out of discharging relation with the receptacles 183.

It is to be understood that the bottle capping operations can be postponed until a number of bottles are filled by adjusting the holder support in the upper recess 253 in such position as to be unaffected by the movement of the other capping elements adjacent thereto. Then after a desired number of bottles have been filled the capping device can be very simply, by positioning the holder in the recess 252, brought into operation and then, continuous operation of filling and capping can be achieved merely by replacing the filled and capped bottles by empty ones during the operation of the apparatus.

Figure 1:
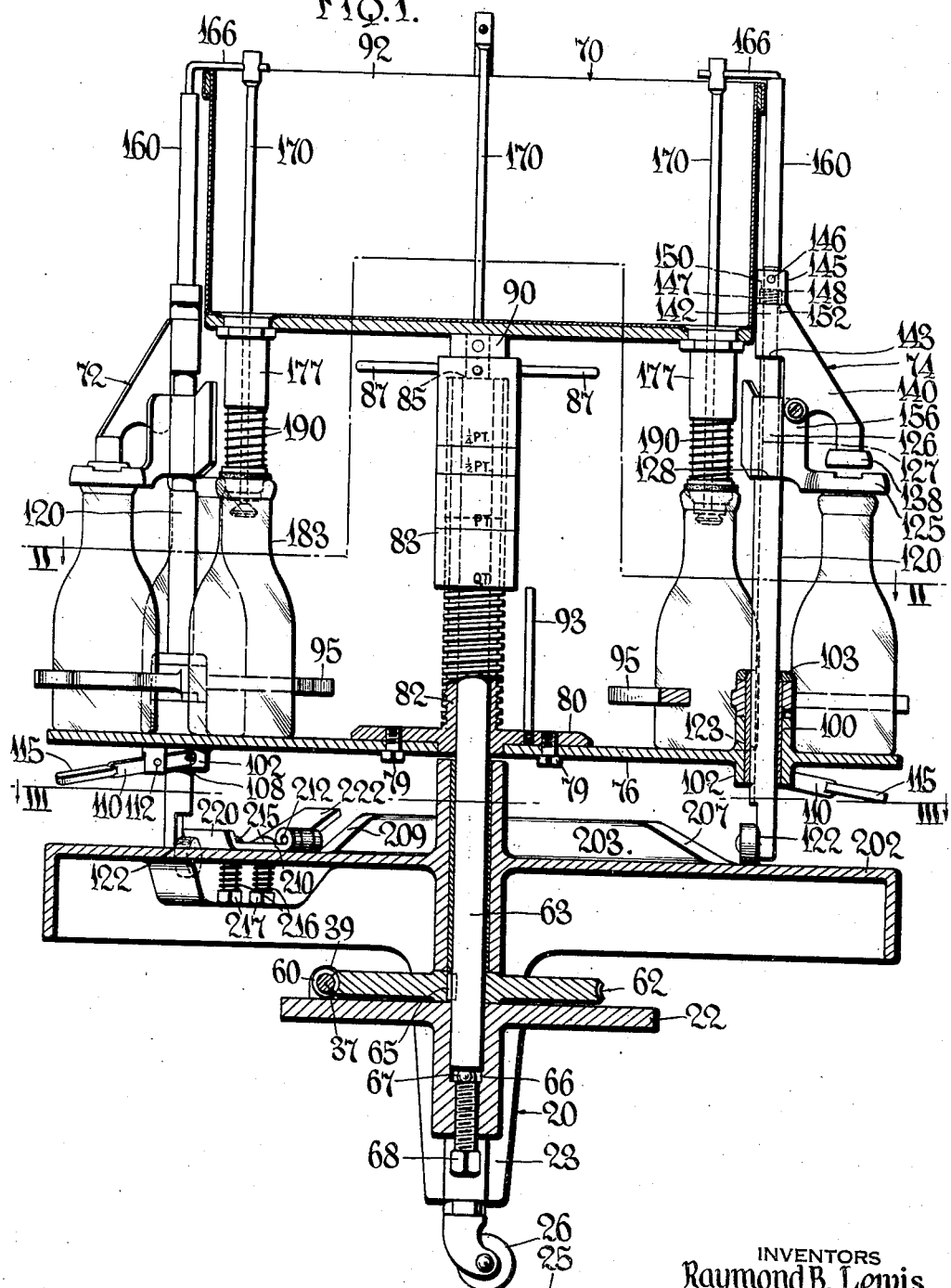
Fig. 1 is a vertical section of the apparatus in which the invention is incorporated, and illustrating portions in elevation, the section being taken substantially along the line I—I of Fig. 2.
Figure 2:
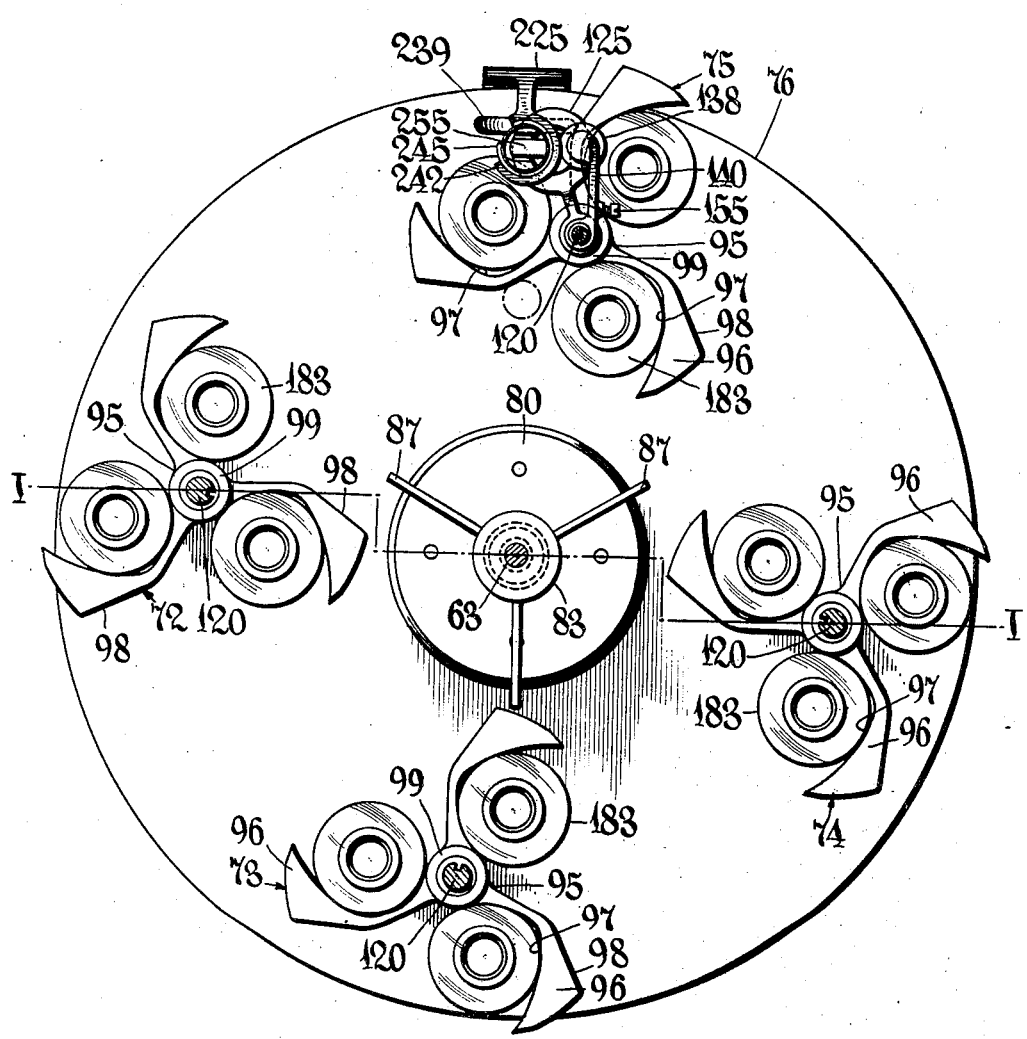
Fig. 2 is a horizontal section of the apparatus taken substantially along the line II—II of Fig. 1, portions of the device being shown in plan and portions being omitted for the sake of clearness.

The operations just described are with reference to the filling and capping of one size of bottle. By adjusting the sleeve 83 to vary the distance between the bottom of the reservoir 92 and the table 76, other sizes of bottles can likewise be filled and capped. Incidental to this adjustment the slide 233 moves upon the inclined guide bar 235, and hence, the position of the actuating wheel 239 connected thereto is varied laterally. Thus according to the adjustment made, the wheel 239 will in turn move the bottle shifter 95 through a greater or lesser angle during rotation of the table 76, depending upon the direction of adjustment of the sleeve 83. This variation of angular adjustment of the bottle shifter 95 is designed to compensate for different diameters of bottle mouths because it is to be understood that the vertical axis of a larger bottle when resting in the concave section 97 of the shifter will be farther away from the arm 96 than the vertical axis of a bottle of smaller diameter resting in the same position. Therefore, the wheel 239 always shifts the bottles positioned as indicated in Fig. 2, to their exact positions in alinement with the capping head 125 and filling sleeve 177 for automatic filling and capping.

Referring to Fig. 8, the bottle replacing position of the apparatus can be designated as that outlined in the upper broken lines; that is, when the camming bar 120 has been raised to its highest position by the cam surface 203. The capping position can be indicated as that wherein the bar 120 is in its lower position indicated by the lower broken lines of this figure. At the beginning of the movement into the latter position the bottle filling operation is also initiated and the filling sleeve 177 remains in filling position until the bar 120 reaches the high section 203 of the cam track.

Although only one form of the invention has been shown and described in detail, it will be apparent to those skilled in the art that the invention is not so limited, but that various changes can be made therein without departing from the spirit of the invention or from the scope of the appended claims.

We claim:

1. A receptacle filling machine comprising a base, an upright central shaft rotatably mounted on the base, means for rotatably driving the shaft, a table rigidly connected to the shaft and constituting with the latter a shaft and table unit for supporting thereon a plurality of receptacles to be filled, a plurality of sets of camming members carried by said base and unit, receptacle filling means including a movable nozzle, means for mounting said filling means on said shaft and table unit, means extending from one of said sets of camming members to the nozzle for actuating the latter into discharging relation with a receptacle carried by the shaft and table unit and in response to rotation of the latter on said base, another of said sets of camming members including mechanism for bodily shifting the receptacles on said unit progressively into registering relation with said nozzle in response to rotation of said unit on said base and in timed relation with the nozzle actuating means whereby the latter and the bodily shifting mechanism are operable alternately.

2. In a receptacle filling machine, a base, a receptacle carrying table rotatably supported on said base, receptacle filling means rotatable with said table, actuating mechanism carried by said base, a device movably mounted on said table and intermittently engageable with said mechanism for bodily shifting the receptacles upon the table surface successively into registering relation with said filling means, and means for adjusting the table toward and away from the base, said mechanism including means operatively associated with both the base and table and automatically responsive to table adjustment to alter the degree of shifting movement of said device whereby the device is adapted for registering different sizes of receptacles with the filling means.

3. In a receptacle filling and capping machine, a stationary base having a cam track thereon, a central column, a table rotatable on the column and adapted to support receptacles on the upper surface thereof, a reservoir supported by said column and rotatable concurrently with said table, a filling nozzle carried by said reservoir, a capping device, a cam operated rod connected to the capping device and to the nozzle and engaging the cam track for operating said filling nozzle and capping device, and a receptacle shifting mechanism rotative relative to said table, means on said base for intermittently rotating said shifting mechanism on the table for successively sliding receptacles into registering relation with said filling nozzle and capping device.

4. A receptacle filling and capping machine comprising a stationary base, a table, a reservoir, means rotatably supporting the table and reservoir for concurrent rotation on the base, a nozzle carried by the reservoir and connected with the interior thereof for discharging fluid therefrom, a capping mechanism, a rod slidable through the table and connecting to the nozzle and capping mechanism for operating them, a cam track on the base engaging said rod for actuating the latter, a receptacle shifting device mounted rotatively relative to the table at a location spaced from the axis of rotation of said table, means operatively associated with the base and table and intermittently engageable with said shifting device whereby the latter successively shifts receptacles into registering relation with the filling nozzle and capping device, and means for varying the degree of intermittent shifting of said device whereby the device is adapted for registering various sizes of receptacles with the nozzle and capping device.

5. In a bottle manipulating apparatus, a capping and filling unit including a reservoir and table relatively movable in substantially horizontal planes, a base having means for supporting the unit thereon, means for relatively rotating the supporting means and unit about a substantially vertical axis, a filling nozzle extending from the reservoir, a capping device mounted on the table, means on the base in the path of relative movement of the base and supporting means for operating the capping device, means in said path of the base and supporting means for opening and closing the filling nozzle, means for supporting bottles in predetermined positions on the base in registering relation with the nozzle and capping device, means automatically feeding bottle caps to the bottles in response to relative movement of the base and unit, shifting devices for positioning bottles on their supports into registering relation with the filling nozzle and capping device, and, means engageable with the shifting device and responsive to relative movement of said unit and supporting means for successively moving bottles from registering relation to the filling nozzle to registering relation to the capping device.

RAYMOND B. LEWIS.
JOHN REUTHER.